US005960814A

United States Patent [19]

Kot

[11] Patent Number: 5,960,814

[45] Date of Patent: Oct. 5, 1999

[54] COUNTER BALANCED LOCKING VALVE

[75] Inventor: Norbert J Kot, Brookfield, Wis.

[73] Assignee: NGT, LLC., Elm Grove, Wis.

[21] Appl. No.: 08/928,935

[22] Filed: Sep. 12, 1997

[51] Int. Cl.[6] .................... F16K 15/18

[52] U.S. Cl. .................... 137/87.01; 91/420; 137/106

[58] Field of Search .................... 137/87.01, 106; 91/420

[56] References Cited

U.S. PATENT DOCUMENTS

| | | | |
|---|---|---|---|
| 2,478,002 | 8/1949 | Mott . | |
| 2,959,188 | 11/1960 | Kepner . | |
| 3,165,980 | 1/1965 | Peras . | |
| 3,229,721 | 1/1966 | Bingel . | |
| 3,335,750 | 8/1967 | Kepner . | |
| 3,404,650 | 10/1968 | Miller et al. | 91/420 X |
| 3,527,250 | 9/1970 | Thomas et al. . | |
| 3,792,715 | 2/1974 | Parrett et al. . | |
| 3,817,154 | 6/1974 | Martin . | |
| 3,975,987 | 8/1976 | Panis . | |
| 3,980,336 | 9/1976 | Bitonti . | |
| 4,018,136 | 4/1977 | Kaetterhenry . | |
| 4,172,582 | 10/1979 | Bobnar . | |
| 4,192,338 | 3/1980 | Gerulis . | |
| 4,287,812 | 9/1981 | Iizumi | 91/420 |
| 4,397,221 | 8/1983 | Friesen et al. | 91/420 |
| 4,500,069 | 2/1985 | Barber et al. . | |
| 4,531,449 | 7/1985 | Reith . | |
| 4,838,306 | 6/1989 | Horn et al. | 91/420 |
| 5,081,904 | 1/1992 | Horn et al. | 91/420 |

FOREIGN PATENT DOCUMENTS

| | | |
|---|---|---|
| 1071100 | 4/1954 | France . |
| 1 217 212 | 5/1966 | Germany . |
| 1943 090 | 3/1971 | Germany . |
| 24 49 599 | 4/1976 | Germany . |
| 57-12170 | 1/1982 | Japan . |
| 379801 | 7/1973 | Russian Federation . |
| 670260 | 7/1979 | Russian Federation . |
| 671765 | 7/1979 | Russian Federation . |
| 674706 | 7/1979 | Russian Federation . |
| 334050 | 12/1958 | Switzerland . |
| 449876 | 1/1935 | United Kingdom . |
| 603795 | 9/1945 | United Kingdom . |
| 1 379 455 | 2/1972 | United Kingdom . |

OTHER PUBLICATIONS

NGT LLC,MAC® Balanced Poppet 3–Way and 4–Way Air Valves, Undated.

*Primary Examiner*—Stephen M. Hepperle
*Attorney, Agent, or Firm*—Ryan Kroholz & Manion

[57] ABSTRACT

A valve assembly includes a check valve element in the output chamber. The check valve element opens to permit forward flow of fluid under pressure in the output chamber from a source toward a load. The check valve element closes to block back flow of fluid under pressure in the output chamber from the load toward the source. The back flow of fluid under pressure exerts a closing force upon the check valve element from within the output chamber. A counter force generating element is located within the output chamber and coupled to the valve element. The counter force generating element applies a counter force to the check valve element, which urges the valve element toward the opened condition. The counter force is, by purpose, less than the closing force, so the check valve element remains closed. Nevertheless, the presence of the counter force reduces the overall sealing forces applied by check valve element, thereby reducing the magnitude of force which is ultimately required to unseat the check valve element.

29 Claims, 5 Drawing Sheets

COUNTER BALANCED LOCKING VALVE

FIELD OF THE INVENTION

The invention relates to fluid pressure operated systems and devices, particularly those required to lift and hold heavy loads.

BACKGROUND OF THE INVENTION

Systems and devices using fluid pressure for lifting and holding heavy loads are known. These systems and devices typically include check valves, which prevent sudden and potentially damaging loss of load-lifting forces when the supply of pressurized fluid unexpectedly fails. Typically, the check valves are opened either by applying a lower pressure pilot fluid, or by applying manual pressure, sufficient to overcome the locking forces.

The amount of force required to open a check valve depends upon the area of the main check valve that is locked, and the magnitude of the locking forces. For example, to unseat a main check valve having a 0.75 inch diameter, which is seated at a locking force of 100 psi, about 44 pounds of opening force must be applied. This opening force is more than a typical operator can apply, either manually or using a solenoid. Furthermore, the application of this force using pilot fluid pressure requires the use of relatively large pilot pistons. The requirement of relatively high pilot pressure force imposes added wear and tear both upon the check valve and the pilot piston, which leads to reduced operating life. The requirement of large pilot pistons also increases the overall dimensions of the valve itself.

There is a need for pilot check valves requiring reduced operating forces, which, in turn, will lead to increased operating life. There is also a need for pilot check valves having a more compact size.

SUMMARY OF THE INVENTION

The invention provides a valve assembly comprising an output chamber for receiving a fluid under pressure. The output chamber has an inlet passage attachable to a source of fluid under pressure and an outlet passage attachable to a load.

The valve assembly includes a check valve element in the output chamber. The check valve element is operable in an opened condition, which permits forward flow of fluid under pressure in the output chamber from the source toward the load. The check valve element is also operable in a closed condition, which blocks back flow of fluid under pressure in the output chamber from the load toward the source. The back flow of fluid under pressure exerts a closing force upon the check valve element from within the output chamber. The back flow of fluid can occur, for example, because of a sudden, unanticipated loss of pressure in the inlet passage. The check valve element holds the load in this pressure loss event.

According to the invention, the valve assembly further includes a counter force generating element, which is located within the output chamber and coupled to the valve element. The counter force generating element operates in response to pressure caused by the back flow of fluid in the output chamber. The element applies a counter force to the check valve element, which urges the valve element toward the opened condition. The counter force is, by purpose, less than the closing force, so the check valve element remains in the closed, load holding condition. Nevertheless, the presence of the counter force reduces the overall sealing forces applied by check valve element, thereby reducing the magnitude of force which is ultimately required to unseat the check valve element when forward flow of fluid under pressure is again desired, or when it is required to relieve the load pressure. Wear and tear on the check valve element is reduced.

In a preferred embodiment, the counter force generating element applies the counter force from outside the output chamber.

In a preferred embodiment, the valve assembly further includes a relief element located outside the output chamber and coupled to the check valve element. The relief element applies an external opening force, which, in combination with the counter force, moves the check valve element to the opened condition against the closing force in the output chamber. The opening force allows forward flow of fluid under pressure to resume to the load, or allows the load pressure to be relieved under controlled circumstances.

Since the counter force is present to reduce the overall magnitude of force required to unseat the check valve element, wear and tear on both the relief element and check valve element are reduced. Furthermore, due to the presence of the counter force, the relief element can be operated by typical manual force, or by force typically applied by an external mechanical actuator, like a solenoid. The presence of the counter force also makes possible the design of smaller valve assemblies.

The features and advantages of the invention will become apparent from the following description, the drawings, and the claims.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DESCRIPTION OF THE PREFERRED EMBODIMENTS

Figure 1:
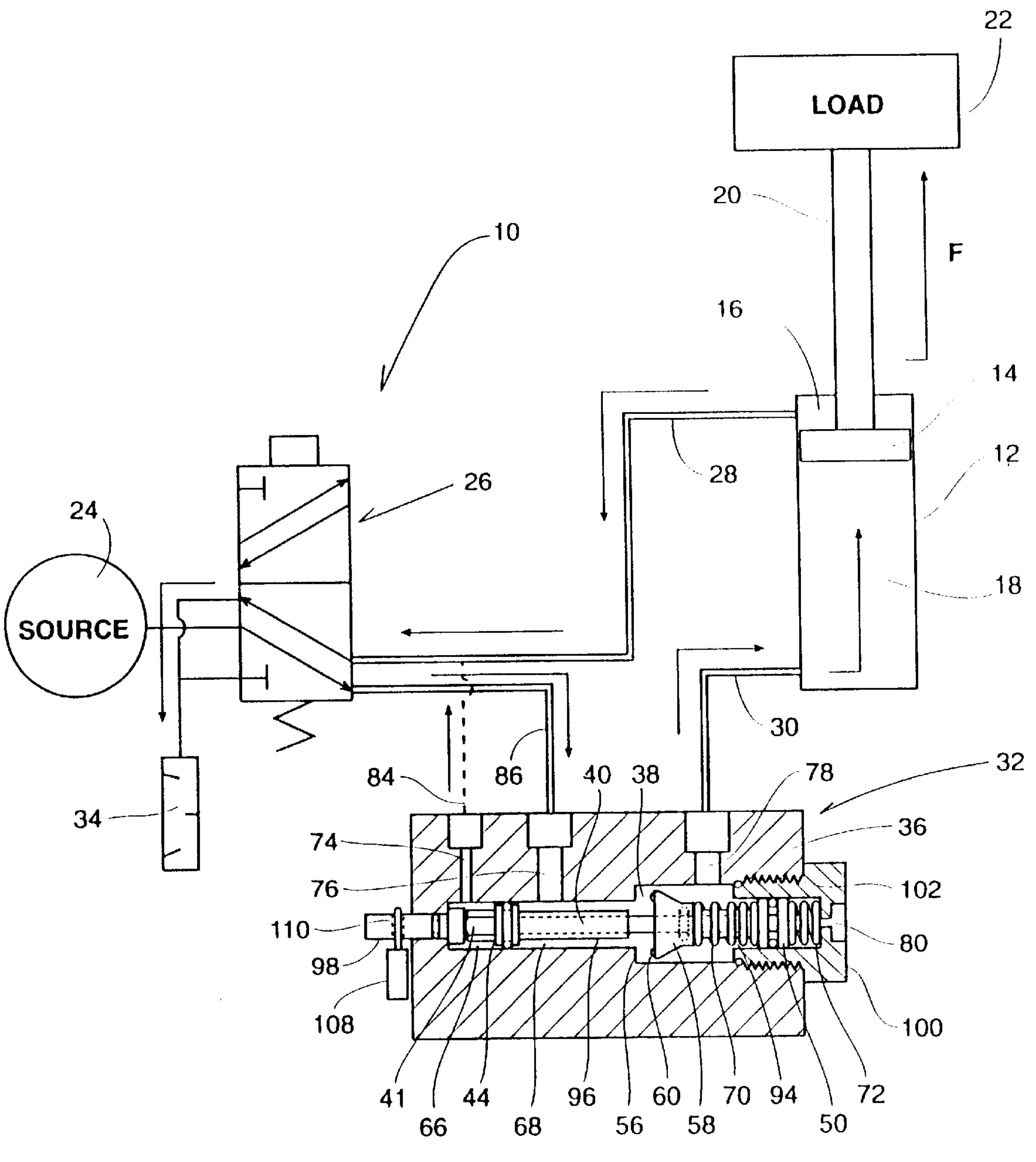
FIG. 1 is a largely schematic view of a load handling system which incorporates a counter balanced locking valve, the system being shown in its load handling stage.
Figure 2:
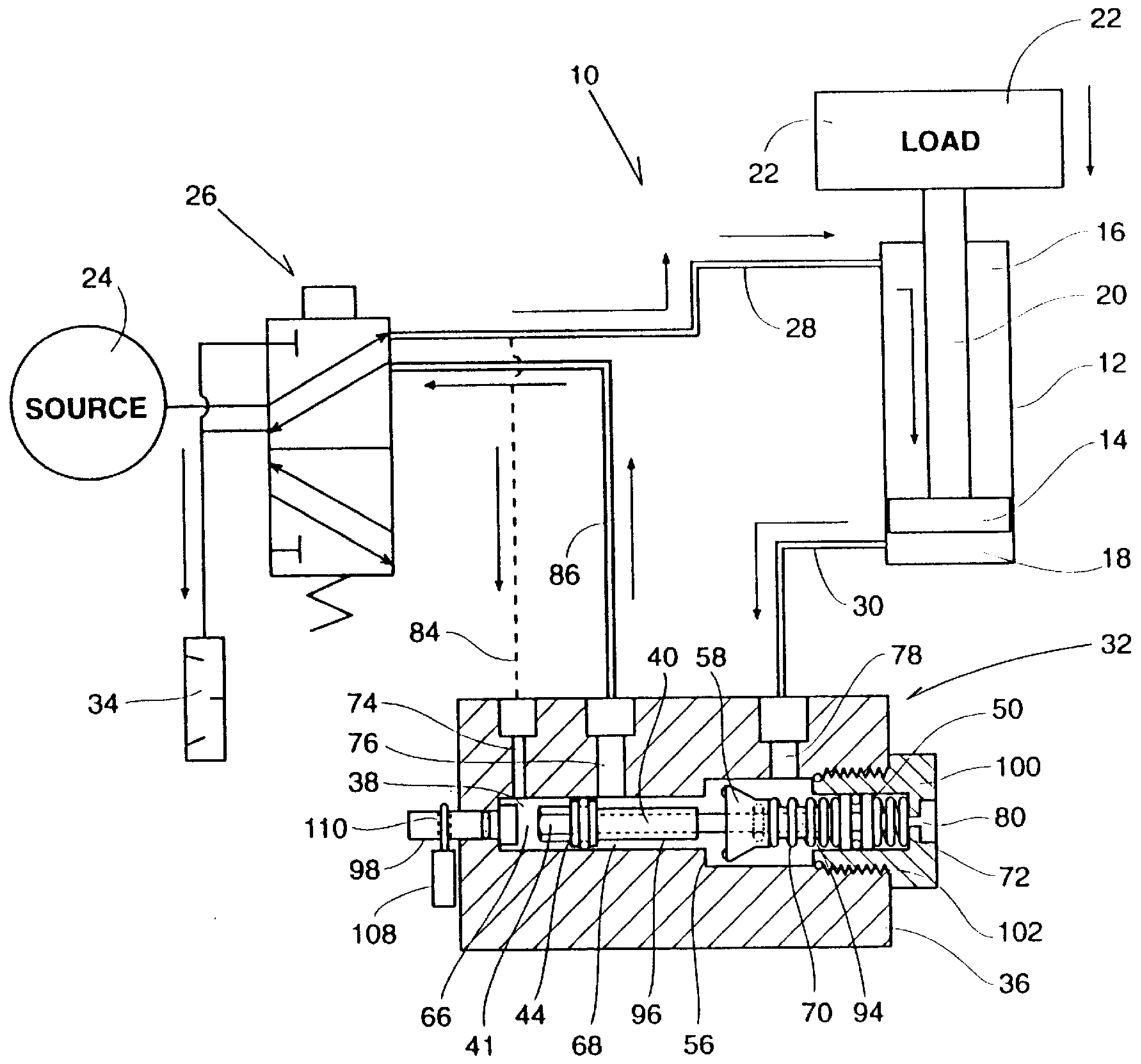
FIG. 2 is a largely schematic view of the load handling system shown in FIG. 1, with the system being shown in its at rest stage.

FIGS. 1 and 2 show a load handling system 10 in a load lifting stage (FIG. 1) and in an at rest stage (FIG. 2). The system 10 includes a force transmitting device 12 to handle a load 22.

In the illustrated embodiment, the device 12 comprises a load lifting cylinder, which operates in response to fluid pressure. The cylinder 12 houses a piston 14, which divides the cylinder 12 into two chambers 16 and 18. A link 20 couples the piston 14 to a load 22.

Fluid lines 28 and 30 communicate with the chambers 16 and 18, respectively, to convey pressurized fluid to and from the chambers 16 and 18 to lift and lower the load 22. The system 10 includes a source 24 of pressurized fluid for conveyance to the cylinder 12 and a return sump or vent 34 to receive pressurized fluid exhausted from the cylinder 12. The source 24 can comprise a hydraulic pump. However, in the illustrated and preferred embodiment, the source 24 comprises a pneumatic pump.

The system 10 includes a main control valve 26, which directs flow through the fluid lines 28 and 30 between the cylinder 12, the source 24, and the vent 34. When placed in a first condition (shown in FIG. 1), the main control valve 26 directs pressurized fluid from the source 24 to the chamber 18, while directing pressurized fluid exhausted from the chamber 16 to the vent 34. As a result, the piston 14 advances the link 20 to transmit force F to the load 22. This constitutes the load lifting stage.

When placed in a second condition (shown in FIG. 2), the control valve 26 directs pressurized fluid from the source 24 to the chamber 16, while directing pressurized fluid exhausted from the chamber 18 to the vent 34. As a result, the piston 14 retracts the link 20, and thereby relieves the load force F. This constitutes the at rest stage.

The system 10 includes a locking valve 32 coupled to the fluid lines 28 and 30. The locking valve 32 locks pressurized fluid in the chamber 18 during the load lifting stage should the system 10 experience an unexpected loss of fluid pressure supplied to the chamber 18. The loss of fluid pressure can occur, for example, due to failure of the source 24 or the main control valve 26. The locking valve 32 prevents a sudden loss of the load force F, despite loss of supply pressure. The load 22 remains lifted under this condition.

Figure 3:
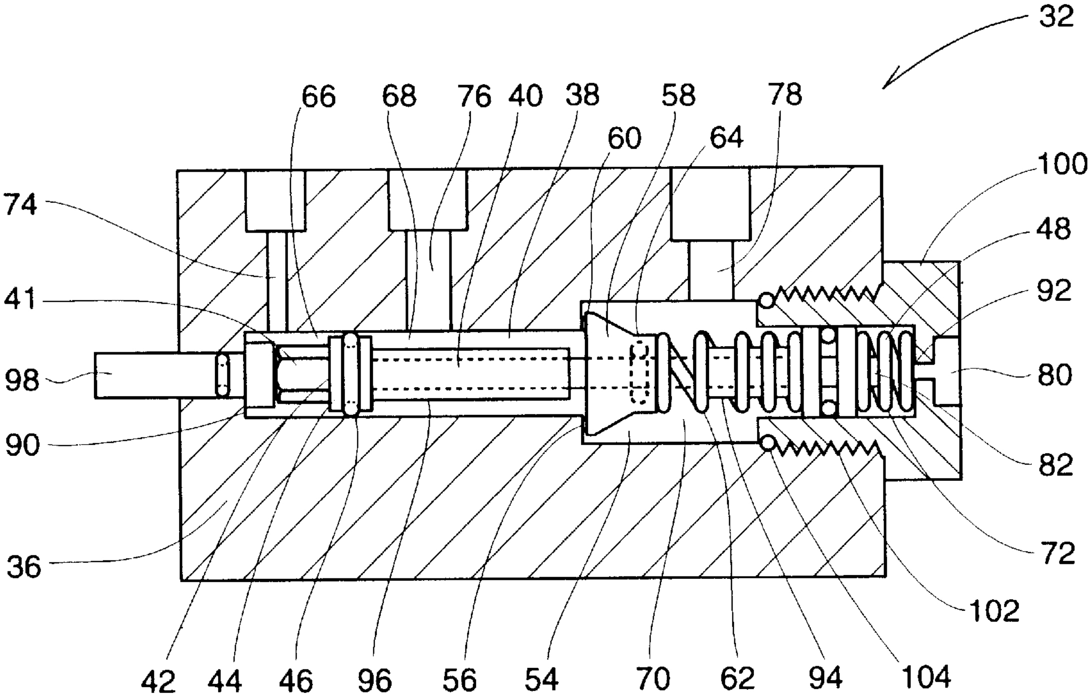
FIG. 3 is a side sectional view of the counter balanced locking valve which the system shown in FIGS. 1 and 2 incorporates, with the valve components shown in a normal locking condition prior to use.

As best shown in FIGS. 3 and 4, the locking valve 32 includes a valve body 36, e.g., made of molded or drilled metal. A formed valve bore 38 extends through the valve body 36. A valve stem 40 is carried for movement within the bore 38. The valve stem 40 is made, e.g., of molded metal.

The valve stem 40 includes a first end region 42, which carries a relief piston 44. The relief piston 44 is secured by a locking screw (not shown) about the end region 42 for common movement with the valve stem 40 within the bore 38. In the illustrated embodiment, an end nut 41 is threadably engaged on the first end region 42 next to one side of the relief piston 44. A force applying element or spacer 98 carried on the valve stem 40 extends from the other side of the relief piston 44.

The outer periphery of relief piston 44 carries a sealing element 46, which can, for example, take the form of a lubricated O-ring. The element 46 sealingly engages the interior of the bore 38, to prevent leakage of fluid about the relief piston 44. The seal element 46 nevertheless permits movement of the stem 40 and relief piston 44 within the bore 38.

As FIG. 3 shows, the normal position of the valve stem 40 keeps the relief piston 44 a set distance spaced away from the adjacent closed end region 90 of the bore 38. A push pin 98 projects into the end region 90 next to the end nut 41. The push pin 98 transmits external force to move the valve stem 40 within the bore 38, as will be described in greater detail later.

The valve stem 40 includes a second end region 48, which carries a counter force piston 50. In the illustrated embodiment (see FIG. 4B), the counter force piston 50 is an integrally molded part of the valve stem 40. As FIG. 4B also shows, a spacer 96, which extends from the counter force piston 50, is also an integrally molded part of the valve stem 40.

The outer periphery of counter force piston 50 carries a sealing element 52, which can, for example, take the form of a lubricated O-ring. The element 52 sealingly engages the interior of the bore 38, like sealing element 46, to prevent leakage of fluid about the counter force piston 50, without impeding sliding movement of the counter force piston 50 along the bore 38. A spring 82 normally urges the counter force piston 50 a set distance away from the adjacent closed end region 92 of the bore 38.

The closed end regions 90 and 92 of the bore 38, which the first and second pistons 44 and 50 occupy, have generally the same interior diameter. The pistons 44 and 50 therefore possess generally the same outer diameter.

The bore 38 includes an interior region 54 between its closed end regions 90 and 92, in which the interior diameter of the bore 38 increases. The change in interior diameters forms an interior valve seat 56.

Figure 6:
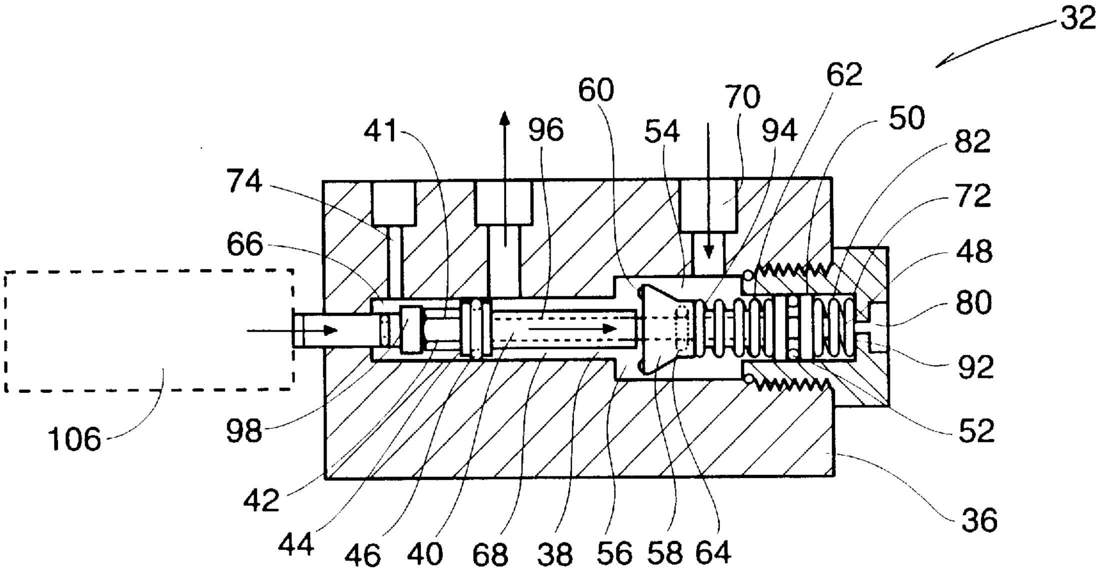
FIG. 6 is a side sectional view of the counter balanced locking valve shown in FIG. 3, with the valve components moved manually into an unlocked condition.

The valve stem 40 carries a check valve poppet 58 for sliding movement within the enlarged region 54 of the bore 38. The poppet 58 can be moved in a first direction along the valve stem 40 into engagement against the valve seat 56 (as FIG. 3 shows). The poppet 58 can also be moved along the valve stem 40 in a second direction away from the valve seat 56 (as, for example, FIG. 6 shows).

A spring 62 carried about the spacer 94 extends between the poppet 58 and the counter force piston 50. When the counter force piston 50 occupies its normally biased position (which is controlled by the biasing spring 82, already described), the spring 62 normally urges the poppet 58 in the first direction into engagement against toward the valve seat 56.

The poppet 58 carries a sealing element 60, which can, e.g., be an O-ring. The element 60 sits in and seals the valve seat 56 against fluid leakage. An interior sealing element 64 in the poppet 58 (which can also be, for example, a lubricated O-ring) also makes sealing contact about the valve stem 40, to prevent fluid leakage between the poppet 58 and valve stem 40, without impeding sliding movement of the poppet 58 along the valve stem 40, as previously described.

Figure 4A:
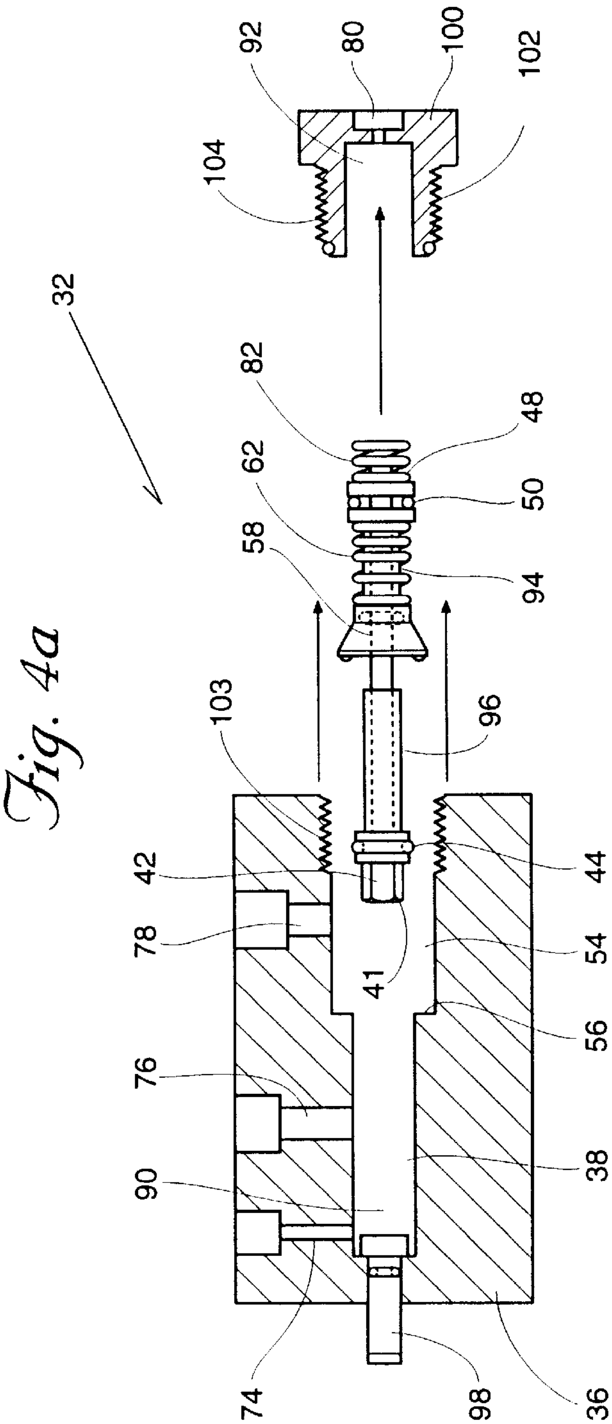
FIG. 4A is an exploded side sectional view of the locking valve shown in FIG. 3, with the end cap removed to accommodate removal and replacement of the interior valve components.

In the illustrated and preferred embodiment (as shown in FIG. 4A), the valve body 36 includes an end cap 100, which forms the end region 92 of the bore 38. Exterior threads 102 on the end cap 100 mate with interior threads 103 in the bore 38 to permit removal of the end cap from the valve body 36. With the end cap removed, the valve stem 40 and the valve components it carries can be easily removed and replaced. There is therefore no need to separate the valve body 36 from its associated fluid lines for routine maintenance and repair. The end cap 100 includes an appropriate sealing element 104 (of the type previously described) to prevent leakage of pressurized fluid about the cap 100 when screwed onto the valve body 36.

Figure 4B:
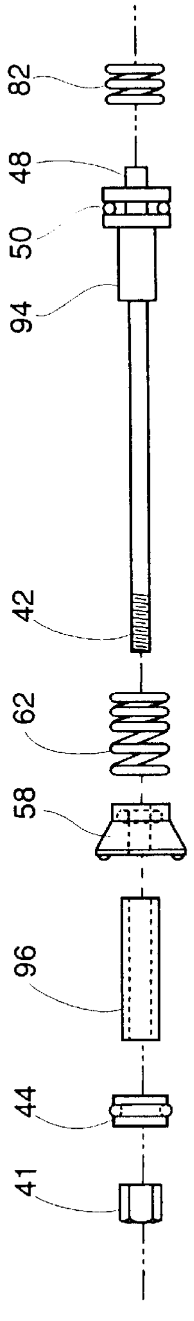
FIG. 4B is an exploded side view of the interior valve components, which are carried on a common valve stem.

As FIG. 4B shows, with the end cap unscrewed from the valve body 36, the valve components carried on the valve stem 40 can also be easily replaced. By unscrewing the locking nut 41 and loosening the locking screw (not shown) on the relief piston 44, the operator can slide the relief piston 44, spacer 96, poppet 58, and biasing spring 62 from the end 42 of the valve stem 40 for replacement. The operator can likewise slide the biasing spring 82 from the other end 48 of the valve stem 40 for replacement. The valve stem 40 and integrally molded counter force piston 50 and spacer 94 can be replaced as a unit.

When assembled, the presence of the sealing pistons 44 and 50 and the sealing poppet 58 divides the bore 38 of the locking valve 32 into four chambers 66, 68, 70, and 72.

The first chamber 66 extends between the sealing relief piston 44 and the adjacent closed end 90 of the bore 38. A pilot port 74 communicates with the first chamber 66. The pilot port 74 is constricted to reduce the flow rate of fluid delivered to the first chamber 66, relative to the flow rate of fluid delivered to the second and third chambers 68 and 70. A pilot line 84 couples the pilot port 74 to the fluid line 28 (see FIGS. 1 and 2), which is, in turn, coupled to the control valve 26.

The second chamber 68 extends between the sealing relief piston 44 and the valve seat 56, which is normally sealed by the spring-biased poppet 58. An input port 76 communicates with the second chamber 68. An input line 86 couples the input port 76 to the control valve 26, as FIGS. 1 and 2 show.

The third chamber 70 extends between the valve seat 56 (normally sealed by the poppet 58) and the sealing counter force piston 50. An output port 78 communicates with the third chamber 70. The fluid line 30 is coupled to the output port, as FIGS. 1 and 2 show.

The fourth chamber 72 extends between the sealing counter force piston 50 and the adjacent closed end 92 of the bore 38. A vent port 80 on the end cap 100 communicates with the fourth chamber 72.

In use (see FIG. 1), the operator places the control valve 26 in the first condition. Pressurized fluid is conveyed from the source 24, through the input line 86 and input port 76, into the second chamber 68 of the locking valve 32. The fluid pressure in the second chamber 68 moves the poppet 58 against the bias of the spring 62 away from its normally seated condition, opening the valve seat 56. The moving poppet 58 will eventually contact the spacer 94, which limits the travel of the poppet 58 in the second direction away from the valve seat.

As FIG. 1 shows, with the poppet 58 unseated, pressurized fluid flows past the valve seat 56 into the third chamber 70, through the output port 78 and into the fluid line 30. The pressurized fluid enters the chamber 18, moving the piston to apply force F to the load 22. The control valve 26 exhausts fluid in the chamber 16 through fluid line 28 to the vent 34.

The operator maintains the control valve 26 in its first condition for as long as it is necessary to apply force F to the load 22. When it is time to relieve the force F, the operator shifts the control valve 36 to its second condition.

By placing the control valve 26 in the second condition (see FIG. 2), pressurized fluid is conveyed from the source 24, through the fluid line 28 into the chamber 16. The pressure in the third chamber 70 will exceed and the pressure in the second chamber 68, and the poppet 58 will return under the bias force of the spring 62 to its normal seated position against the valve seat 56 (as FIG. 3 shows). The poppet 58 will be urged toward its normal seated position against the valve seat 56 whenever the pressure in the second chamber 68 is equal to or less than pressure in the third chamber 70. The pressure in the third chamber 70 under this circumstance exerts a closing force upon the poppet 58 from within the third chamber.

However, when the control valve 26 is in its second condition, pressurized fluid is conveyed in the pilot line 84 through the pilot port 74 into the first chamber 66. The pressurized fluid bears against and moves the relief piston 44, to thereby shift the valve stem 40 toward the end region 92 of the bore 38.

Movement of the valve stem 40 toward the end region 92 of the bore 38, in turn, will move the spacer 96 from its normal position spaced from the poppet 58 into contact against the poppet 58. This movement of the spacer 96 mechanically lifts the poppet 58 from the valve seat 56 (as FIG. 2 shows), to overcome the closing force upon the poppet 58 and open communication between the second and third chambers 68 and 70. Fluid exhausted by the chamber 18 flows in the line 30, through the output port 78 into the third chamber 70, and thence into the second chamber 68 and through the input port 76 into the input line 86. The control valve 26 couples the input line 86 to the vent 34. The force F on the load 22 is relieved. The load 22 returns in a controlled manner to an at rest position, as FIG. 2 shows.

Figure 5:
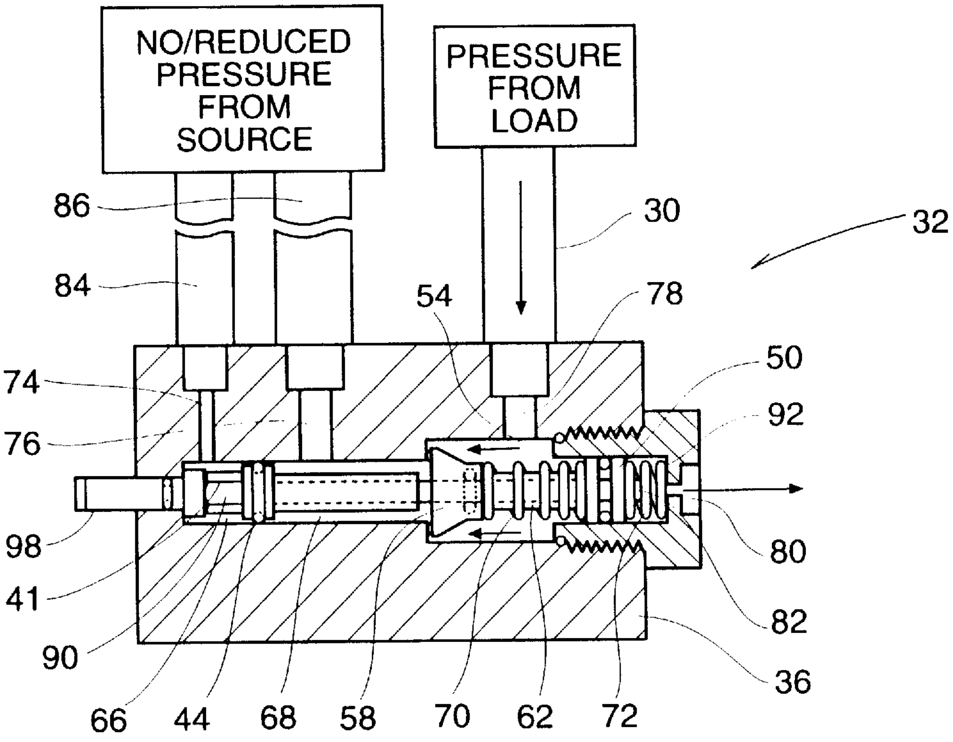
FIG. 5 is a side sectional view of the counter balanced locking valve shown in FIG. 3, with the valve components shown in a locked and counter balanced condition during use.

Should the source 24 or main control valve 26 fail when the control valve 36 is in the first condition, the reduced pressure in the second chamber 68 relative to the pressure in the third chamber 70 causes the poppet 58 to return to its normal seated position against the valve seat 56 (as FIG. 5 shows). Pressurized fluid existent in the chamber 18 and fluid line 30 exerts the closing force upon the poppet 58 and is thereby trapped by the seated poppet 58 from escaping the now sealed third chamber 70. There is no loss of load force F, despite the absence of pressurized fluid input.

As FIG. 5 also shows, the closing force caused by pressurized fluid trapped in the third chamber 70, which bears against the poppet 58 to maintain the poppet 58 against the valve seat 56, also bears against and moves the counter force piston 50 against the bias of spring 82, toward the end region 92. Movement of the counter force piston 50 moves the valve stem 40 and attached relief piston 44, which, in turn, pulls the spacer 96 from its normal position spaced from the poppet 58 toward contact against the poppet 58. Responding to movement of the piston 50 due to pressurized fluid in the third chamber 70, the spacer 96 exerts a mechanical counter force upon the poppet 58, urging it away from the valve seat 56. However, since the area of the counter force piston 50 is less than the area of the poppet 58, the closing force of the pressurized fluid upon the poppet 58 is greater than the contrary opening force exerted by the counter force piston 50 through the spacer 96. The poppet 58 therefore remains in sealing engagement against the valve seat 56. However, the counter force exerted by the counter force piston 50 through the spacer 96 reduces the overall sealing forces applied against on the poppet 58, compared to the overall sealing forces that would be encountered in the absence of the counter force the counter force piston 50 creates.

Upon repair of the source of pressure failure, the operator can overcome the locking action of the valve 32 by shifting the control valve 26 into the second condition. As FIG. 2 shows, and as previously described, this applies pressurized fluid in the pilot line 84 through the pilot port 74 into the first chamber 66. Pressurized fluid in the first chamber 66 bears against and moves the relief piston 44 to bring the spacer 96 into contact against the poppet 58, lifting it away from the valve seat 56. With communication open between the second and third chambers 68 and 70, the operator can exhaust pressure from the chamber 18 in the controlled fashion previously described. Since the counter force exerted by the counter force piston 50 reduces the overall sealing forces applied against on the poppet 58, the magnitude of pressurized fluid required in the first chamber 66 to unseat the poppet 58 is reduced accordingly.

In the illustrated embodiment, the locking valve 32 includes a push pin 98 in the bore end 90. Instead of applying pressurized fluid through the pilot port 74 as just described, the operator can manually press against the push pin 98 to move the relief piston 44 to unseat the poppet 58. Since the counter force exerted by the counter force piston 50 reduces the overall sealing forces applied against on the poppet 58, the magnitude of manual force required to move the relief piston 44 and unseat the poppet 58 is reduced accordingly. Alternatively, the push pin 98 can be coupled to an electrically actuated solenoid 106 (shown in phantom lines in FIG. 6).

In the illustrated embodiment (see FIG. 1), the portion of the push pin 98 located outside the valve body 36 includes a through hole 110. The hole 110 allows attachment of a padlock 108 or the like to lock the push pin 98, to protect against accidental or unplanned actuation of the manual poppet release function.

The presence of the counter force exerted by the counter force piston 50 significantly reduced the magnitude of force required to overcome the locking forces. In the absence of the counter force exerted by the counter force piston 50, a force of about 44 pounds would be required to unseat a poppet valve 58 having a seat diameter of 0.75 inch, when exposed to a locking pressure of 100 psi in the third chamber 70. In the presence of the counter force exerted by the counter force piston 50, the force to unseat the same poppet at the same locking pressure is reduced to about 10 pounds. The significantly reduced unlocking force makes possible the use of manual pressure or an electric solenoid. The significantly reduced unlocking force also reduces wear and tear upon the poppet 58 and other valve components carried by the valve stem 40.

In use, air trapped in the first chamber 66 and the fourth chamber 72 also help reduce impact forces generated during opening and closing the poppet 58. When either the relief piston 44 or the counter force piston 50 are moved, the resulting compression of air in the chambers 66 and 72 cushion the speed of the poppet 58. The vent 80 slowly allows cushioned air to escape the fourth chamber 72. Wear and tear are further reduced.

Various features of the invention are set forth in the following claims.

I claim:

1. A valve assembly comprising an output chamber for receiving a fluid under pressure, the output chamber having an inlet passage attachable to a source of fluid under pressure and an outlet passage attachable to a load, a check valve element in the output chamber operable in an opened condition, which permits forward flow of fluid under pressure in the output chamber through the inlet passage from the source toward the load, the check valve element also being operable in a closed condition, which blocks back flow of fluid under pressure in the output chamber through the outlet passage from the load toward the source, the back flow of fluid under pressure through the outlet passage exerting a closing force upon the check valve element from within the output chamber, and a piston located within the output chamber, the piston being coupled to the check valve element and moving in the output chamber in response to the back flow of fluid under pressure through the output passage to apply a counter force urging the check valve element toward the opened condition, the counter force being less than the closing force.

2. A valve assembly according to claim 1 and further including a force applying element located outside the output chamber, and linkage which couples the piston to the force applying element to apply the counter force to the check valve element from outside the output chamber in response to movement of the piston within the output chamber.

3. A valve assembly according to claim 1 and further including a relief element located outside the output chamber, the relief element being coupled to the check valve element and operating to apply an external opening force, which in combination with the counter force, moves the check valve element to the opened condition against the closing force in the output chamber.

4. A valve assembly according to claim 3 wherein the relief element includes a force applying element which moves in response to fluid under pressure.

5. A valve assembly according to claim 3 wherein the relief element includes a force applying element which moves in response to manual force.

6. A valve assembly according to claim 3 wherein the relief element includes a force applying element which moves in response to an external actuator.

7. A valve assembly according to claim 6 wherein the external actuator includes a solenoid.

8. A valve assembly according to claim 3 and further including a pilot chamber for receiving a fluid under pressure, and wherein the relief element is located within the pilot chamber and operates in response to fluid under pressure in the pilot chamber.

9. A valve assembly according to claim 8 and further including a force applying element located outside the pilot chamber coupled to the relief element to apply the opening force to the check valve element in response to fluid under pressure in the pilot chamber.

10. A valve assembly according to claim 1 wherein the check valve element includes a valve seat in the output chamber communicating with the inlet passage, and a poppet in the output chamber movable into sealing engagement against the valve seat, comprising the closed condition, and movable out of sealing engagement against the valve seat, comprising the opened condition.

11. A valve assembly according to claim 10 wherein the check valve element includes a spring which exerts a biasing force to normally urge the poppet toward the closed condition.

12. A valve assembly comprising an output chamber for receiving a fluid under pressure, the output chamber having an inlet passage attachable to a source of fluid under pressure and an outlet passage attachable to a load, a check valve element in the output chamber operable in an opened condition, which permits forward flow of fluid under pressure in the output chamber from the source toward the load, the check valve element also being operable in a closed condition, which blocks back flow of fluid under pressure in the output chamber from the load toward the source, the back flow of fluid under pressure exerting a closing force upon the check valve element from within the output chamber, a counter force generating element located within the output chamber, the counter force generating element being coupled to the check valve element and operating in response to the back flow of fluid under pressure in the output chamber to apply a counter force urging the check valve element toward the opened condition, the counter force being less than the closing force, and a relief element located outside the output chamber, the relief element being coupled to the check valve element and including a force applying element which moves in response to an external solenoid to apply an external opening force, which in combination with the counter force, moves the check valve element to the opened condition against the closing force in the output chamber.

13. A valve assembly comprising an output chamber for receiving a fluid under pressure, the output chamber having an inlet passage attachable to a source of fluid under pressure and an outlet passage attachable to a load, a valve stem having a first stem portion located within the output chamber, a check valve element carried by the first stem portion in the output chamber, the check valve element being operable in an opened condition, which permits forward flow of fluid under pressure in the output chamber from the source toward the load, the check valve element also being operable in a closed condition, which blocks back flow of fluid under pressure in the output chamber from the load toward the source, the back flow of fluid under pressure exerting a closing force upon the check valve element from within the output chamber, and a counter force generating element carried by the first stem portion in the output chamber, the counter force generating element being coupled to the check valve element and operating in response to the back flow of fluid under pressure in the output chamber to apply a counter force urging the check valve element toward the opened condition, the counter force being less than the closing force.

14. A valve assembly according to claim 13 wherein the valve stem includes a second stem portion located outside the output chamber, and further including a relief element carried by the second stem element to apply an external opening force, which in combination with the counter force, moves the check valve element to the opened condition against the closing force in the output chamber.

15. A valve assembly according to claim 14 and further including a force applying element carried by the second stem portion which is operatively linked to both the counter force generating element and the relief element by the valve stem.

16. A valve assembly according to claim 15 wherein the force applying element operates in response to fluid pressure.

17. A valve assembly according to claim 15 wherein the force applying element operates in response to manual force.

18. A valve assembly according to claim 15 wherein the force applying element operates in response to an external actuator.

19. A valve assembly according to claim 18 wherein the external actuator comprises a solenoid.

20. A valve assembly according to claim 13 wherein the counter force generating element includes a piston carried by the first stem portion in the output chamber which moves in response to pressure.

21. A valve assembly according to claim 20 and further including a force applying element located outside the output chamber, and linkage which couples the piston to the force applying element to apply the counter force to the check valve element from outside the output chamber in response to movement of the piston within the output chamber.

22. A valve assembly comprising an output chamber for receiving a fluid under pressure, the output chamber having an inlet passage attachable to a source of fluid under pressure and an outlet passage attachable to a load, a valve stem having an axis and including a first stem portion located within the output chamber, a check valve element in the output chamber including a valve seat communicating with the inlet passage and a poppet carried for sliding movement on the first stem portion along the axis between an opened condition, in which the poppet is out of sealing engagement against the valve seat and which permits forward flow of fluid under pressure in the output chamber from the source toward the load, and a closed condition, in which the poppet is in sealing engagement against the valve seat and which blocks back flow of fluid under pressure in the output chamber from the load toward the source, the back flow of fluid under pressure exerting a closing force upon the poppet from within the output chamber, and a counter force generating element located within the output chamber, the counter force generating element being coupled to the poppet and operating in response to the back flow of fluid under pressure in the output chamber to apply a counter force urging the poppet toward the opened condition, the counter force being less than the closing force.

23. A valve assembly according to claim 22 wherein the valve stem includes a second stem portion located outside the output chamber, and wherein the counter force generating element includes a piston secured to the first stem portion and a force applying element carried by the second stem portion, the piston being movable in response to pressure within the output chamber away from the poppet to advance the valve stem and pull the force applying element toward and into contact with the poppet from outside the output chamber, thereby applying the counter force.

24. A valve assembly according to claim 22 wherein the valve stem includes a second stem portion located outside the output chamber, and further including a relief element carried by the second stem element to apply an external opening force, which in combination with the counter force, moves the check valve element to the opened condition against the closing force in the output chamber.

25. A valve assembly according to claim 24 and further including a force applying element carried by the second stem portion which is operatively linked to both the counter force generating element and the relief element by the valve stem.

26. A valve assembly according to claim 25 wherein the force applying element operates in response to fluid pressure.

27. A valve assembly according to claim 25 wherein the force applying element operates in response to manual force.

28. A valve assembly according to claim 25 wherein the force applying element operates in response to an external actuator.

29. A valve assembly according to claim 28 wherein the external actuator comprises a solenoid.

* * * * *